United States Patent
Reynolds et al.

(10) Patent No.: US 8,756,329 B2
(45) Date of Patent: Jun. 17, 2014

(54) SYSTEM AND METHOD FOR PARALLEL MULTIPLEXING BETWEEN SERVERS IN A CLUSTER

(75) Inventors: Nathan Reynolds, Mesa, AZ (US);
Oleksandr Otenko, Winnersh (GB);
Joshua Dorr, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 13/109,871

(22) Filed: May 17, 2011

(65) Prior Publication Data

US 2012/0066400 A1  Mar. 15, 2012

Related U.S. Application Data

(60) Provisional application No. 61/383,285, filed on Sep. 15, 2010, provisional application No. 61/384,227, filed on Sep. 17, 2010.

(51) Int. Cl.
*G06F 15/16* (2006.01)

(52) U.S. Cl.
USPC ........... 709/228; 409/223; 409/226; 409/227; 409/231; 409/232

(58) Field of Classification Search
USPC .................. 709/223–228, 230–234, 242
See application file for complete search history.

(56) References Cited

U.S. PATENT DOCUMENTS

| | | | |
|---|---|---|---|
| 5,109,384 A | 4/1992 | Tseung | |
| 6,895,590 B2 | 5/2005 | Yadav | |
| 6,938,085 B1 | 8/2005 | Belkin et al. | |
| 7,554,993 B2 | 6/2009 | Modi et al. | |
| 7,991,904 B2 | 8/2011 | Melnyk et al. | |
| 8,130,776 B1 | 3/2012 | Sundararajan | |
| 8,131,860 B1 | 3/2012 | Wong et al. | |
| 8,578,033 B2 | 11/2013 | Mallart | |
| 2002/0174136 A1 | 11/2002 | Cameron et al. | |
| 2003/0014480 A1 | 1/2003 | Pullara et al. | |
| 2003/0078958 A1 | 4/2003 | Pace et al. | |
| 2003/0110232 A1 | 6/2003 | Chen | |
| 2003/0120822 A1 | 6/2003 | Langrind et al. | |

(Continued)

FOREIGN PATENT DOCUMENTS

GB    2492653    1/2013

OTHER PUBLICATIONS

International Search Report and Written Opinion dated Dec. 6, 2011, PCT/US2011/051697, 11 pages.

(Continued)

*Primary Examiner* — Awet Haile
*Assistant Examiner* — Eric Myers
(74) *Attorney, Agent, or Firm* — Meyer IP Law Group

(57) ABSTRACT

Systems and methods are provided for providing parallel muxing between servers in a cluster. One such system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of muxers, wherein each application server instance includes at least one muxer. Each muxer can receive information from a plurality of threads to transmit to a different muxer on a different application server instance over the Infiniband network using a plurality of parallel channels.

15 Claims, 4 Drawing Sheets

(56) References Cited

U.S. PATENT DOCUMENTS

| | | |
|---|---|---|
| 2004/0177126 A1 | 9/2004 | Maine |
| 2004/0205771 A1* | 10/2004 | Sudarshan et al. ............ 719/316 |
| 2005/0021354 A1* | 1/2005 | Brendle et al. .................... 705/1 |
| 2005/0038801 A1 | 2/2005 | Colrain et al. |
| 2005/0094577 A1 | 5/2005 | Ashwood-Smith |
| 2005/0102412 A1* | 5/2005 | Hirsimaki ..................... 709/232 |
| 2005/0262215 A1 | 11/2005 | Kirov et al. |
| 2006/0015600 A1* | 1/2006 | Piper ............................. 709/223 |
| 2006/0031846 A1 | 2/2006 | Jacobs et al. |
| 2006/0143525 A1 | 6/2006 | Kilian |
| 2006/0176884 A1 | 8/2006 | Fair |
| 2006/0209899 A1* | 9/2006 | Cucchi et al. ................. 370/498 |
| 2006/0294417 A1 | 12/2006 | Awasthi et al. |
| 2007/0198684 A1 | 8/2007 | Mizushima |
| 2007/0203944 A1 | 8/2007 | Batra et al. |
| 2008/0044141 A1* | 2/2008 | Willis et al. ..................... 385/88 |
| 2008/0098458 A2 | 4/2008 | Smith et al. |
| 2008/0140844 A1 | 6/2008 | Halpern |
| 2008/0286741 A1 | 11/2008 | Call |
| 2009/0034537 A1 | 2/2009 | Colrain et al. |
| 2009/0150647 A1 | 6/2009 | Mejdrich et al. |
| 2009/0172636 A1 | 7/2009 | Griffith |
| 2009/0182642 A1 | 7/2009 | Sundaresan |
| 2009/0327471 A1 | 12/2009 | Astete et al. |
| 2010/0198920 A1 | 8/2010 | Wong |
| 2010/0199259 A1 | 8/2010 | Quinn |
| 2011/0029812 A1 | 2/2011 | Lu et al. |
| 2011/0055510 A1* | 3/2011 | Fritz et al. ..................... 711/169 |
| 2011/0066737 A1 | 3/2011 | Mallart |
| 2011/0071981 A1 | 3/2011 | Ghosh et al. |
| 2011/0119673 A1* | 5/2011 | Bloch et al. ................... 718/102 |
| 2011/0161457 A1 | 6/2011 | Sentinelli |
| 2012/0023557 A1 | 1/2012 | Bevan |
| 2012/0066400 A1 | 3/2012 | Reynolds |
| 2012/0066460 A1 | 3/2012 | Bihani |
| 2012/0218891 A1 | 8/2012 | Sundararajan |
| 2012/0239730 A1 | 9/2012 | Revanuru |
| 2013/0004002 A1 | 1/2013 | Duchscher |

OTHER PUBLICATIONS

International Search Report and Written Opinion dated Dec. 6, 2011, PCT/US2011/051459, 9 pages.

Baldwin, The ByteBuffer Class in Java, Aug. 20, 2002, 14 pages. Retrieved from: developer.com.

European Patent Office International Searching Authority, International Search Report and Written Opinion for PCT International Application No. PCT/US2013/067286, Feb. 5, 2014, 10 pages.

* cited by examiner

SYSTEM AND METHOD FOR PARALLEL MULTIPLEXING BETWEEN SERVERS IN A CLUSTER

COPYRIGHT NOTICE

A portion of the disclosure of this patent documents contains material which is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

CLAIM OF PRIORITY

This application claims the benefit of priority to U.S. Provisional patent application titled "MIDDLEWARE MACHINE PLATFORM", Application No. 61/383,285, filed Sep. 15, 2010; and U.S. Provisional patent application titled "MIDDLEWARE MACHINE PLATFORM", Application No. 61/384,227, filed Sep. 17, 2010, each of which applications are herein incorporated by reference.

CROSS REFERENCE TO RELATED APPLICATIONS

This application is related to U.S. patent application titled "SYSTEM AND METHOD FOR ZERO BUFFER COPYING IN A MIDDLEWARE ENVIRONMENT", application Ser. No. 13/109,849, filed May 17, 2011; U.S. patent application titled "SYSTEM AND METHOD FOR PROVIDING SCATTER/GATHER DATA PROCESSING IN A MIDDLEWARE ENVIRONMENT", application Ser. No. 13/170,490, filed Jun. 28, 2011; and U.S. patent application titled "SYSTEM AND METHOD FOR SUPPORTING LAZY DESERIALIZATION OF SESSION INFORMATION IN A SERVER CLUSTER", application Ser. No. 13/167,636, filed Jun. 23, 2011, each of which applications are herein incorporated by reference.

FIELD OF INVENTION

The present invention is generally related to computer systems and software such as middleware, and is particularly related to systems and methods for parallel multiplexing (herein referred to as muxing) between servers in a cluster.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for providing parallel muxing between servers in a cluster. One such system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of multiplexers (herein referred to as a muxer), wherein each application server instance includes at least one muxer. Each muxer can receive information from a plurality of threads to transmit to a different muxer on a different application server instance over the Infiniband network using a plurality of parallel channels.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described above, in recent years, organizations have turned their attention to technologies such as virtualization and centralized storage, and even more recently cloud computing, which can provide the basis for a shared infrastructure. However, there are few all-in-one platforms that are particularly suited for use in such environments. Described herein is a system and method for providing a middleware machine or similar platform (referred to herein in some implementations as "Exalogic"), which comprises a combination of high performance hardware, together with an application server or middleware environment, and additional features, to provide a complete Java EE application server complex which includes a massively parallel in-memory grid, can be provisioned quickly, and can scale on demand.

In particular, as described herein, systems and methods are provided for providing parallel muxing between servers in a cluster. One such system can include a cluster of one or more high performance computing systems, each including one or more processors and a high performance memory. The cluster communicates over an InfiniBand network. The system can also include a middleware environment, executing on the cluster, that includes one or more application server instances. The system can further include a plurality of muxers, wherein each application server instance includes at least one muxer. Each muxer can receive information from a plurality of threads to transmit to a different muxer on a different application server instance over the Infiniband network using a plurality of parallel channels.

Figure 1:
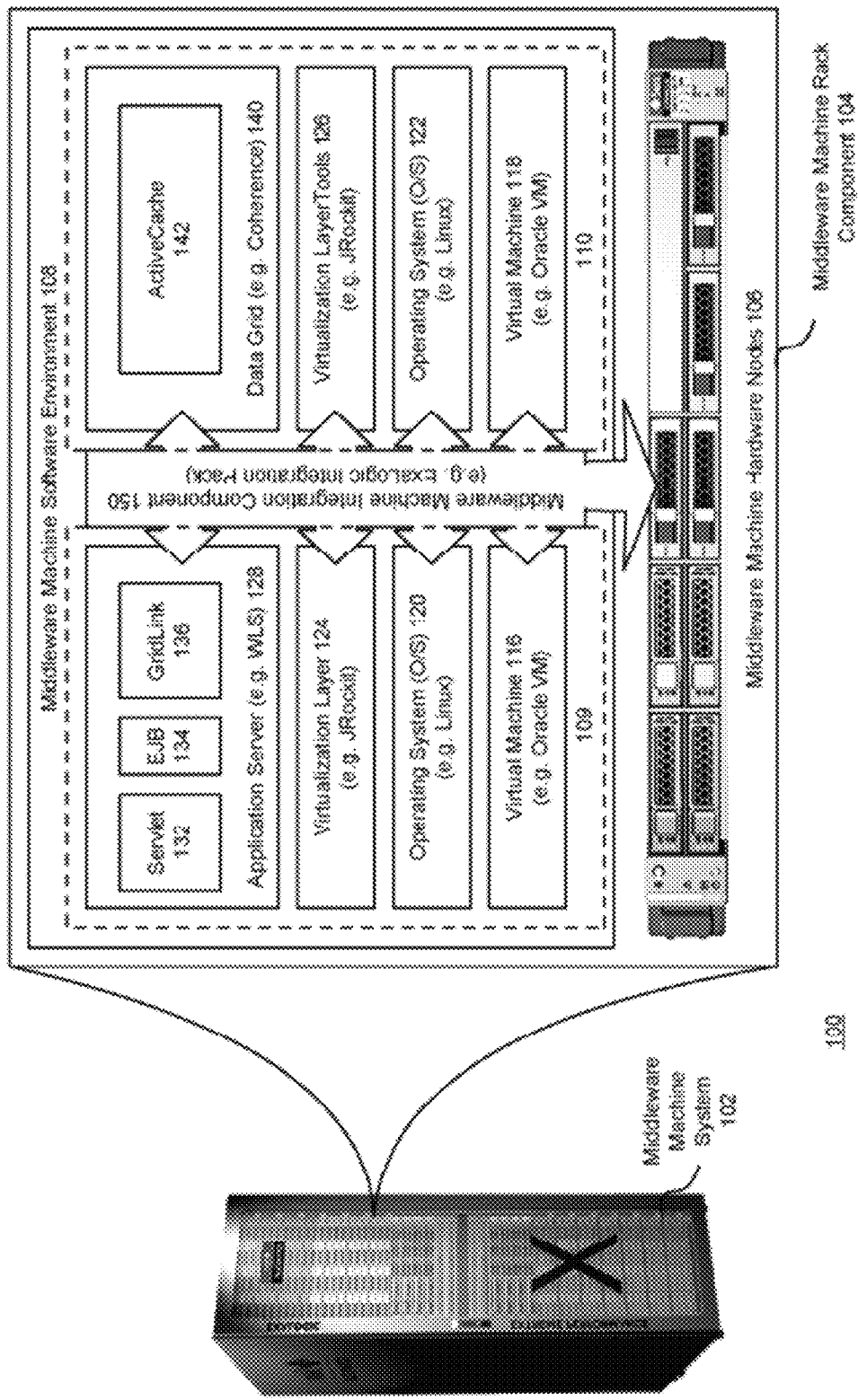
FIG. 1 shows an illustration of a middleware machine environment, in accordance with an embodiment.

FIG. 1 shows an illustration of a middleware machine environment 100, in accordance with an embodiment. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers); while another application server instance 110 could comprise a virtual machine 116, operating system 120, virtualization layer 124, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
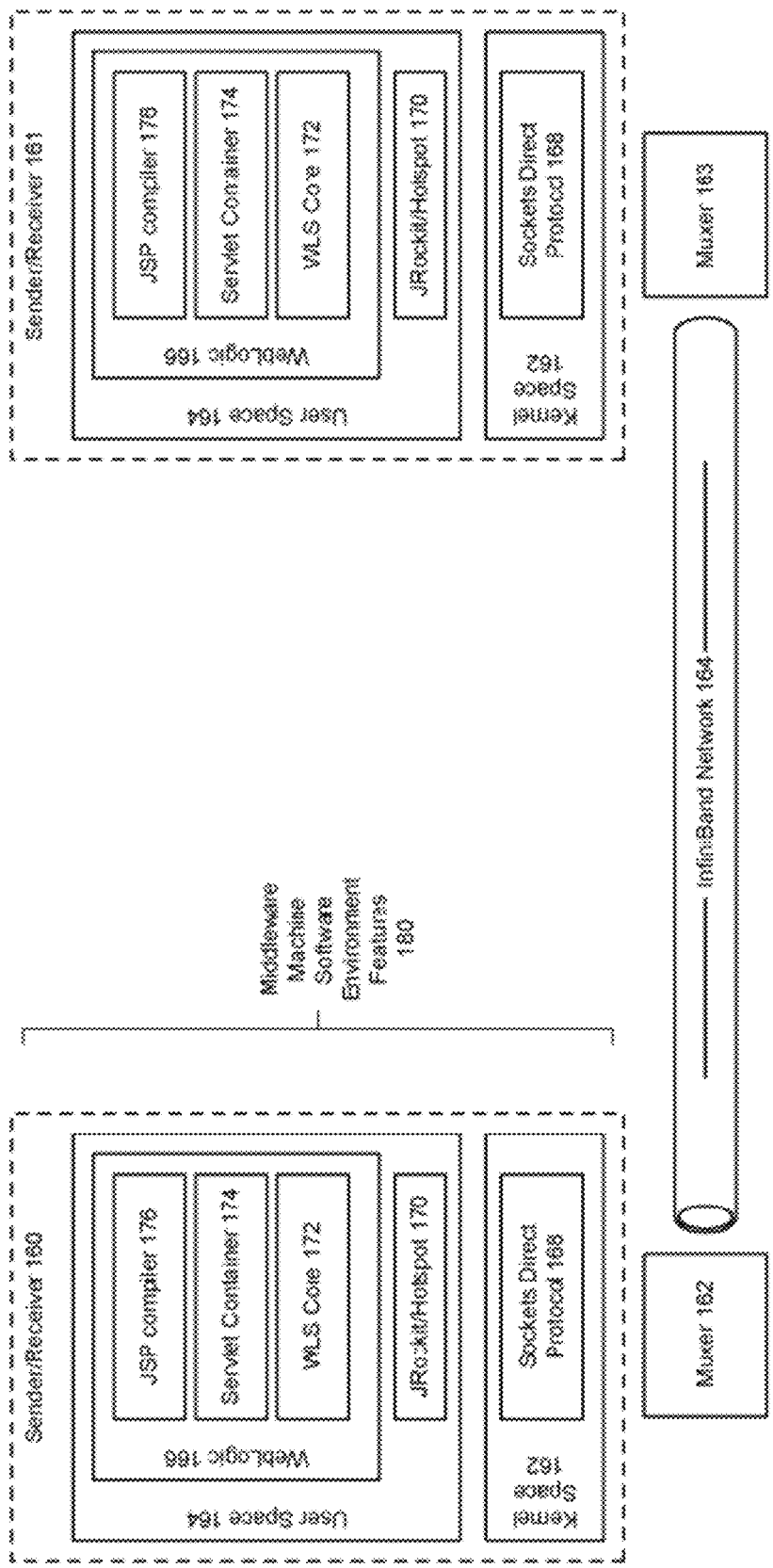
FIG. 2 shows another illustration of a middleware machine platform or environment, in accordance with an embodiment.

FIG. 2 shows another illustration of a middleware machine platform or environment, in accordance with an embodiment. As shown in FIG. 2, each application server instance can act as a sender and/or receiver 160, 161 within the middleware machine environment. Each application server instance is also associated with a muxer 162, 163, that allows application servers to communicate with one another via an InfiniBand network 164. In the example shown in FIG. 2, an application server instance can include a kernel space 162, user space 164, and application server (e.g. WebLogic space) 166, which in turn can includes a sockets direct protocol 168, JVM (e.g. JRockit/Hotspot layer) 170, WLS core 172, servlet container 174, and JSP compiler 176. In accordance with other examples, other combinations of middleware-type software can be included. In accordance with various embodiments, the machine integration component can provide features such as Zero Buffer Copies, Scatter/Gather I/O, T3 Connections, Lazy Deserialization, and GridLink DataSource, to provide the basis for, and improve performance within, the shared infrastructure.

T3 Connections (Parallel Muxing)

Figure 3:
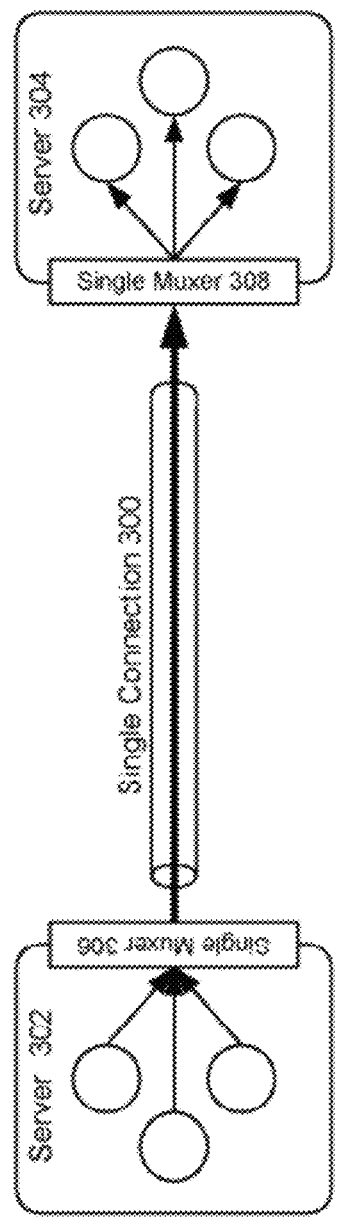
FIG. 3 shows a system that utilizes a single connection between servers, in accordance with an embodiment.

FIG. 3 shows a system that utilizes a single connection between servers, in accordance with an embodiment. As illustrated in FIG. 3, in a typical clustered scenario, a single connection 300 is effected between servers 302 and 304. For example. communications from server 302 are sent to a single muxer 306, where they are transmitted to server 304 over the single connection 300. A corresponding single muxer 308 at server 304 then forwards the communications to their appropriate destinations. However, this single connection is unable to fully utilize bandwidth available in an InfiniBand (IB) network.

Figure 4:
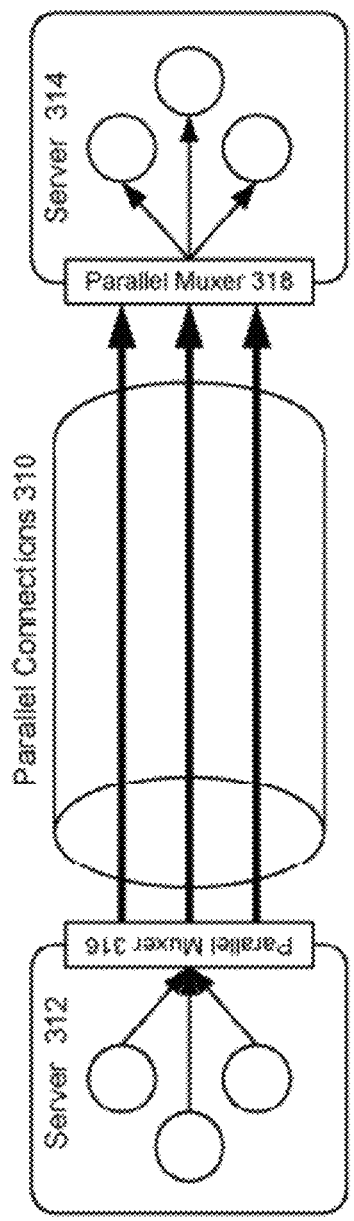
FIG. 4 shows a system that utilizes parallel connections between servers, in accordance with an embodiment.

FIG. 4 shows a system that utilizes parallel connections between servers, in accordance with an embodiment. As shown in FIG. 4, a plurality of parallel connections 310 can be maintained between servers 312 and 314. Each server includes a parallel muxer, 316 and 318, to send communications in parallel over the plurality of connections between the servers. In accordance with an embodiment, the T3, or similar, protocol can be modified to allow multiple connections, which avoids per-connection bottlenecks, and allows better utilization of network bandwidth for features such as in-memory session replication. This enables the available IB bandwidth to be better utilized and provides more efficient communications, with fewer slowdowns, between peers.

As described above, in accordance with an embodiment the platform supports the Internet Protocol over Infiniband (IP-oIB) network in its backplane, wherein the network bandwidth of IB is 25 Gbps. Since a single connection, such as the T3 in Weblogic Server, is unable to fully utilize IB bandwidth for cluster communication, multiple connections have been created in parallel to better utilize network bandwidth. Multiple connections help in spreading out the session replication network traffic.

In accordance with an embodiment, a server, for example a WebLogic server using the T3 protocol, can aggregate messages from all threads into a single sender queue which is flushed over the network by a single thread. Lock contention can occur when multiple processes require the same lock to proceed, for example lock contention can occur between threads attempting to add messages into the sender queue. By creating multiple connections in parallel, lock contention is distributed over multiple connections, thus reducing the per connection lock contention. Also, there are multiple sender threads sending messages over to a remote server instance causing parallelization of work flow.

In accordance with an embodiment, implicit replication channels can be created by using the replication channel configured on a ClusterMBean as a template. The number of implicit channels created is based on the ServerMBean.getReplicationPorts( ) attribute. The implicit channels copy over all the attributes from the ClusterMBean.ReplicationChannels while overriding the port information to keep it unique. The overriding port information is obtained from ServerMBean.getReplicationPorts( ) Additionally, the system can include a utility function which can be used to determine if multiple channels are configured. The utility can make the determination once, automatically at regular intervals, in response to changes to the configuration, and/or at the direction of a user and cache the result for subsequent calls. The system can further create an exclusive Remote Method Invocation (RMI) stub for each replication channel configured (stub assigned for each connection). The system can hash the sessionID to balance the replication request amongst all the stubs, for example by using round-robin or other similar balancing algorithm. The system can also ensure that replication calls are received on one of the replication channels configured for the server.

In accordance with an embodiment, using InfiniBand provides more bandwidth than prior systems which, effectively, provides a larger pipe through which data can be transmitted. To better utilize the larger pipe, multiple parallel logical connections, i.e., channels, can be used instead of a single logical connection. Multiple connections means more concurrent activity can execute without the various executing threads blocking each other. This can be useful, for example for clustering; that is, where multiple servers are communicating with each other in a cluster. In a cluster, session data replication between servers is an important feature. Session data can include, for example, shopping cart or other user data that is specific to a particular visit, or session, to a website. By using multiple connections between servers in the cluster, in-memory session replication to each server can be effected more reliably and more efficiently. This preserves session data in case of server failure and improves the experience of the end user and the service provider.

Figure 5:
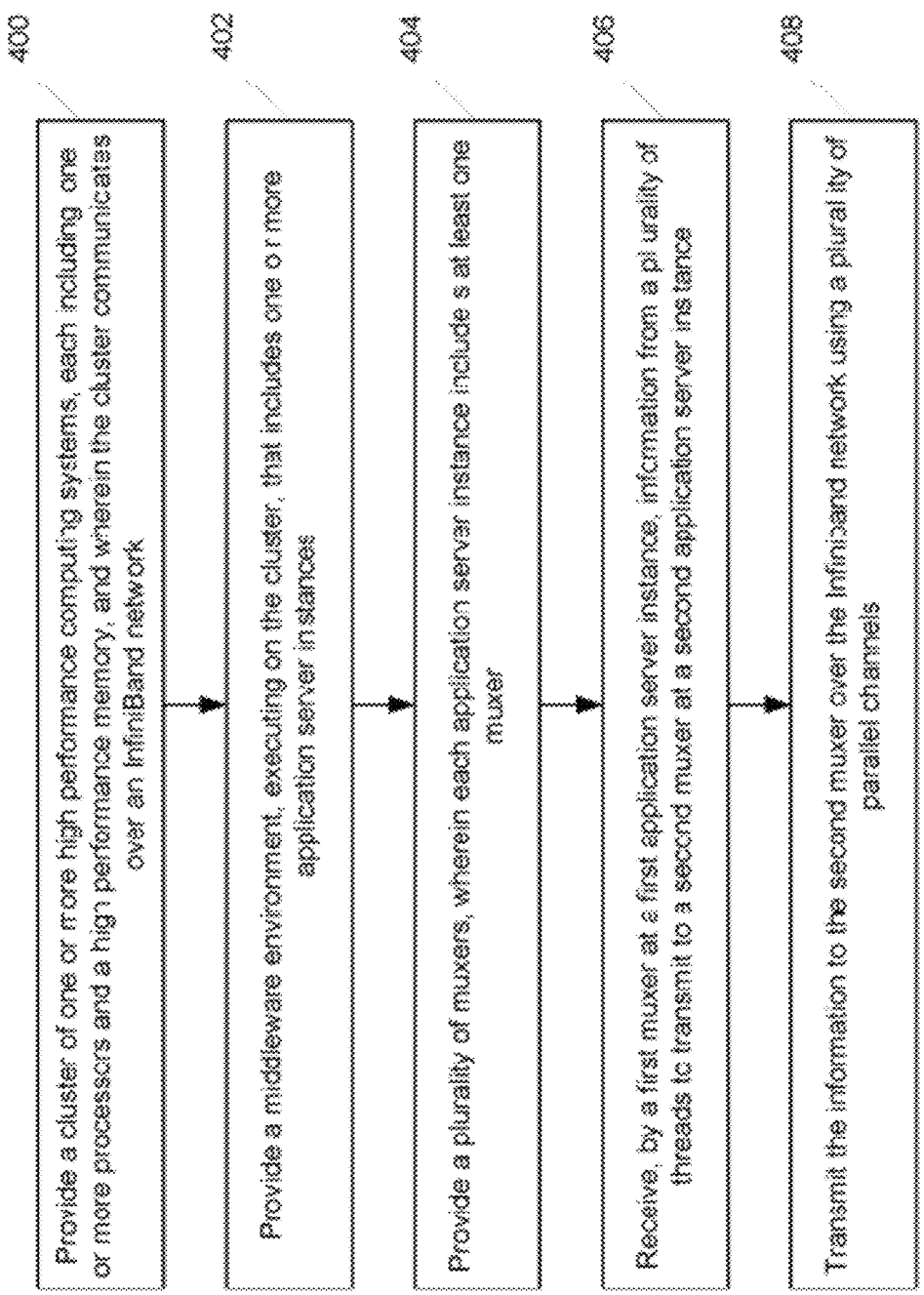
FIG. 5 shows a flowchart of a method for providing parallel muxing between servers in a cluster, in accordance with an embodiment.

FIG. 5 shows a flowchart of a method for providing parallel muxing between servers in a cluster, in accordance with an embodiment. At step 400, a cluster of one or more high performance computing systems is provided. Each of the high performance computing systems can include one or more processors and a high performance memory. Additionally, the cluster can communicate over an InfiniBand network. At step 402, a middleware environment, which executes on the cluster, is provided. The middleware environment can include one or more application server instances. At step 404, a plurality of muxers are provided. Each application server instance can include at least one muxer. At step 406, a first muxer, at a first application server instance, receives information from a plurality of threads to transmit to a second muxer at a second application server instance. At step 408, the information is transmitted to the second muxer over the Infiniband network using a plurality of parallel channels.

In accordance with an embodiment, the method shown in FIG. 4 can also include configuring how many parallel channels are included in the plurality of parallel channels, based on input from a user. Additionally, the information transmitted can include session data. Furthermore, each multiplexer (herein referred to as a muxer) can be a New I/O (NIO) muxer. The method shown in FIG. 4 can further include creating an RMI stub for each of the plurality of parallel channels.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing parallel multiplexing between servers in a cluster, comprising:
   a cluster of one or more high performance computing systems, each including one or more processors and a high performance memory, and wherein the cluster communicates over an InfiniBand network;
   a middleware environment, executing on the cluster, that includes a plurality of application server instances;
   a plurality of multiplexers, wherein each of the plurality of multiplexers resides on a said application server instance and is directly connected with a plurality of parallel channels, wherein each of the plurality of parallel channels is
      created using a replication channel configured for the cluster as a template and overwriting port information therein with a unique port number, and
      further connected to a different multiplexer on a different application server instance;
   a sender queue directly connected with each said multiplexer, wherein the sender queue aggregates messages received from a plurality of threads and places the messages sequentially therein; and
   a plurality of sender threads, wherein each of said sender threads operates on one of said plurality of parallel channels;
   wherein each said multiplexer is operable to
      flush the messages from the sender queue,
      distribute the flushed messages over the plurality of parallel channels, and
      use the plurality of sender threads to transmit the flushed messages concurrently over the plurality of parallel channels to the different multiplexer on the different application server instance over the Infiniband network.

2. The system of claim 1, wherein a user can configure how many parallel channels are included in the plurality of parallel channels.

3. The system of claim 1, wherein the messages include session data.

4. The system of claim 1, wherein each said multiplexer is a New I/O (NIO) multiplexer.

5. The system of claim 1, further comprising a utility function used to determine if multiple channels are configured in response to configuration changes and cache the result for subsequent calls.

6. A method for providing parallel multiplexing between servers in a cluster, comprising:
   providing a cluster of one or more high performance computing systems, each including one or more processors and a high performance memory, and wherein the cluster communicates over an InfiniBand network;
   providing a middleware environment, executing on the cluster, that includes a plurality of application server instances;
   providing a plurality of multiplexers, wherein each said mutiplexier resides on a said application server instance, and is directly connected with a plurality of parallel channels, wherein each of the plurality of parallel channels is
      created using a replication channel configured for the cluster as a template and overwriting port information therein with a unique port number, and further connected to a different multiplexier at a different application server instance;

providing a sender queue directly connected with each said multiplexier, wherein the sender queue aggregates messages received from a plurality of threads and places the messages sequentially therein; and providing a plurality of sender threads, wherein each of said sender threads operates on one of said plurality of parallel channels;

wherein each said multiplexer is operable to
  flush the messages from the sender queue,
  distribute the flushed messages over the plurality of parallel channels, and
  use the plurality of sender threads to transmit the flushed messages concurrently over the plurality of parallel channels.

7. The method of claim 6, further comprising configuring how many parallel channels are included in the plurality of parallel channels, based on input from a user.

8. The method of claim 6, wherein the messages include session data.

9. The method of claim 6, wherein each said multiplexer is a New I/O (NIO) multiplexer.

10. The method of claim 6, wherein a utility function is used to determine if multiple channels are configured in response to configuration changes and cache the result for subsequent calls.

11. A non-transitory computer readable storage medium, including instructions stored there on which, when executed by a computer, cause the computer to perform the steps comprising:

providing a cluster of one or more high performance computing systems, each including one or more processors and a high performance memory, and wherein the cluster communicates over an InfiniBand network;

providing a middleware environment, executing on the cluster, that includes a plurality of application server instances;

providing a plurality of multiplexers, wherein each said mutiplexier resides on a said application server instance, and is directly connected with a plurality of parallel channels, wherein each of the plurality of parallel channels is
  created using a replication channel configured for the cluster as a template and overwriting port information therein with a unique port number, and
  further connected to a different multiplexer at a different application server instance;

providing a sender queue directly connected with each said multiplexier, wherein the sender queue aggregates messages received from a plurality of threads and sequentially place the messages therein; and providing a plurality of sender threads, wherein each of said sender threads operates on one of said plurality of parallel channels;

wherein each said multiplexer is operable to
  flush the messages from the sender queue,
  distribute the flushed messages over the plurality of parallel channels, and
  use the plurality of sender threads to transmit the flushed messages concurrently over the plurality of parallel channels.

12. The non-transitory computer readable storage medium of claim 11, further comprising configuring how many parallel channels are included in the plurality of parallel channels, based on input from a user.

13. The non-transitory computer readable storage medium of claim 11, wherein the messages include session data.

14. The non-transitory computer readable storage medium of claim 11, wherein each said multiplexer is a New I/O (NIO) multiplexer.

15. The non-transitory computer readable storage medium of claim 11, wherein a utility function is used to determine if multiple channels are configured in response configuration changes and cache the result for subsequent calls.

\* \* \* \* \*

UNITED STATES PATENT AND TRADEMARK OFFICE
CERTIFICATE OF CORRECTION

PATENT NO. : 8,756,329 B2
APPLICATION NO. : 13/109871
DATED : June 17, 2014
INVENTOR(S) : Reynolds et al.

It is certified that error appears in the above-identified patent and that said Letters Patent is hereby corrected as shown below:

In the Drawings

On sheet 4 of 4, in figure 5, under Reference Numeral 400, line 1, delete " more " and insert -- more --, therefor.

On sheet 4 of 4, in figure 5, under Reference Numeral 400, line 2, delete " high " and insert -- high --, therefor.

On sheet 4 of 4, in figure 5, under Reference Numeral 402, line 1, delete "o r" and insert -- or --, therefor.

On sheet 4 of 4, in figure 5, under Reference Numeral 404, line 1, delete "include s" and insert -- includes --, therefor On sheet 4 of 4, in figure 5, under Reference Numeral 406, line 1, delete " information " and insert -- information --, therefor.

On sheet 4 of 4, in figure 5, under Reference Numeral 406, line 1, delete "pl urality" and insert -- plurality --, therefor.

On sheet 4 of 4, in figure 5, under Reference Numeral 406, line 2, delete "ins tance" and insert -- instance --, therefor.

On sheet 4 of 4, in figure 5, under Reference Numeral 408, line 1, delete " Infiniband " and insert -- infiniband --, therefor.

Signed and Sealed this
Seventeenth Day of February, 2015

Michelle K. Lee
*Deputy Director of the United States Patent and Trademark Office*

CERTIFICATE OF CORRECTION (continued)
U.S. Pat. No. 8,756,329 B2

On sheet 4 of 4, in figure 5, under Reference Numeral 408, line 1, delete "plural ity" and insert -- plurality --, therefor.

In the Specification

In column 1, line 7, delete "documents" and insert -- document --, therefor.

In column 1, line 12, delete "copyrights" and insert -- copyright --, therefor.

In column 3, line 66, delete "example." and insert -- example, --, therefor.

In the Claims

In column 6, lines 24-25, in Claim 1, delete "multiplexier," and insert -- multiplexer, --, therefor.

In column 6, line 61, in Claim 6, delete "mutiplexier" and insert -- multiplexer --, therefor.

In column 7, line 1, in Claim 6, delete "multiplexier" and insert -- multiplexer --, therefor.

In column 7, line 4, in Claim 6, delete "multiplexier," and insert -- multiplexer, --, therefor.

In column 8, line 2, in Claim 11, delete "mutiplexier" and insert -- multiplexer --, therefor.

In column 8, line 12, in Claim 11, delete "multiplexier," and insert -- multiplexer, --, therefor.